United States Patent [19]
Twidale et al.

[11] 3,727,385
[45] Apr. 17, 1973

[54] AGRICULTURAL VEHICLE

[75] Inventors: William H. Twidale, Islington, Ontario; Mark K. Byrnes, Mississauga, Ontario, both of Canada

[73] Assignee: Massey-Ferguson Industries Limited, Toronto, Ontario, Canada

[22] Filed: Nov. 26, 1971

[21] Appl. No.: 202,214

[52] U.S. Cl. ................................56/208, 56/12.3
[51] Int. Cl. ..............................................A01d 67/00
[58] Field of Search...............................56/208, 12.3

[56] References Cited

UNITED STATES PATENTS 3,574,990  4/1971  Calder.................................56/208

*Primary Examiner*—Louis G. Mancene
*Assistant Examiner*—J. A. Oliff
*Attorney*—Robert L. Farris

[57] ABSTRACT

A ground vehicle having an implement attached at one end of the vehicle for pivotal movement relative to the ground. The implement may be a swather table or the like which is equipped with a pair of power activated lift cylinders for selective raising or lowering of the swather table. The lift cylinders are interconnected between the swather table and one end of a rocker arm which is pivoted to the frame of the vehicle. A pair of counterbalancing springs are co-operatively positioned relative to the lift cylinders and have one end attached to the frame of the vehicle and the other end of the pivotal rocker arm. The upper end of the swather table is supported for pivotal fore and aft movement on a transverse crossbar which is rotatable in the frame of the vehicle. The outer ends of the table-supporting crossbar are each connected to an interconnected lift arm and lever assembly for rotation of the crossbar within the frame upon respective pivotal movement of the swather table. The transverse cross bar defines a torsion rod adapted to maintain the table in level position, and one of the lift arm and lever assemblies is provided with adjusting means for adjustment of the torque characteristic of the torsion spring.

12 Claims, 7 Drawing Figures

INVENTORS.
WILLIAM H. TWIDALE
BY MARK K. BYRNES

Gerhardt, Greenle & Farris
ATTORNEYS.

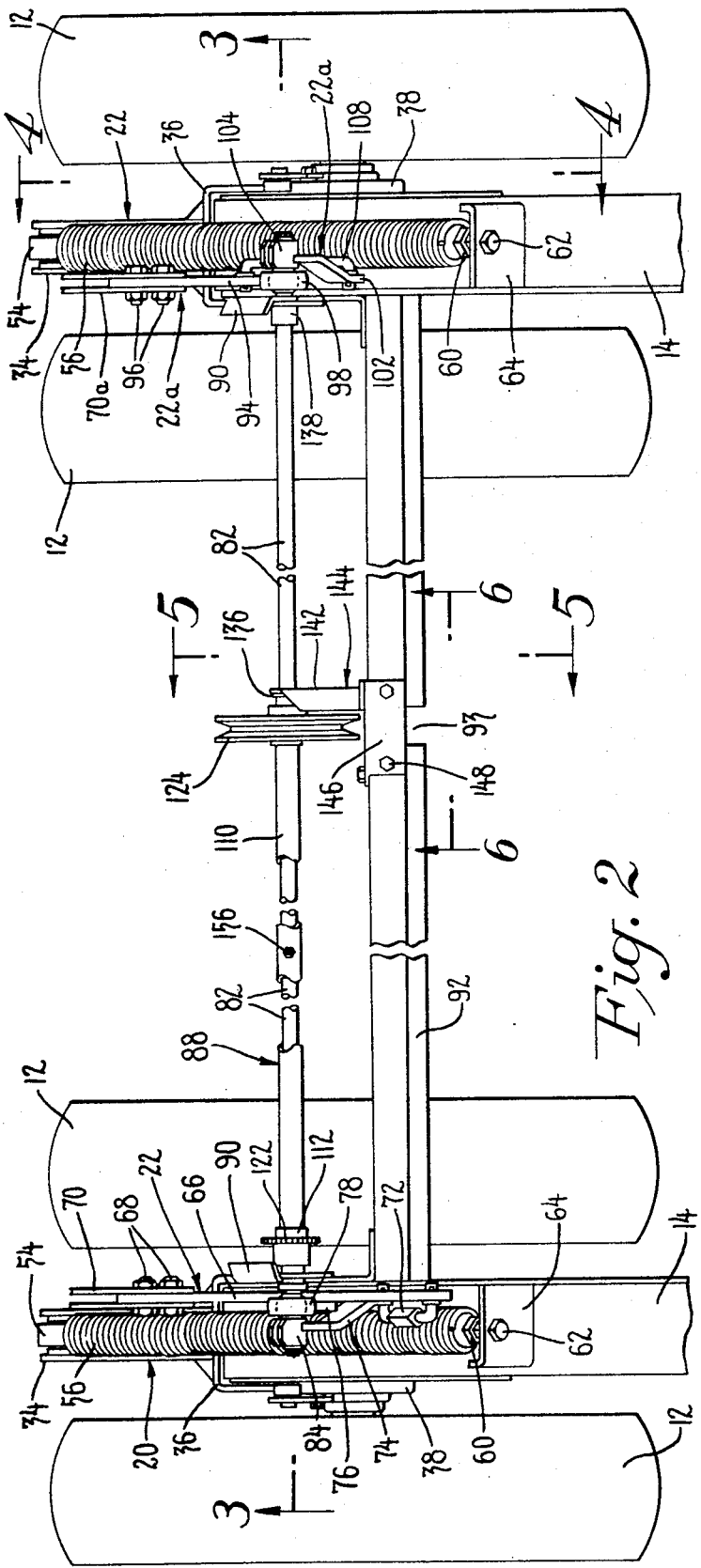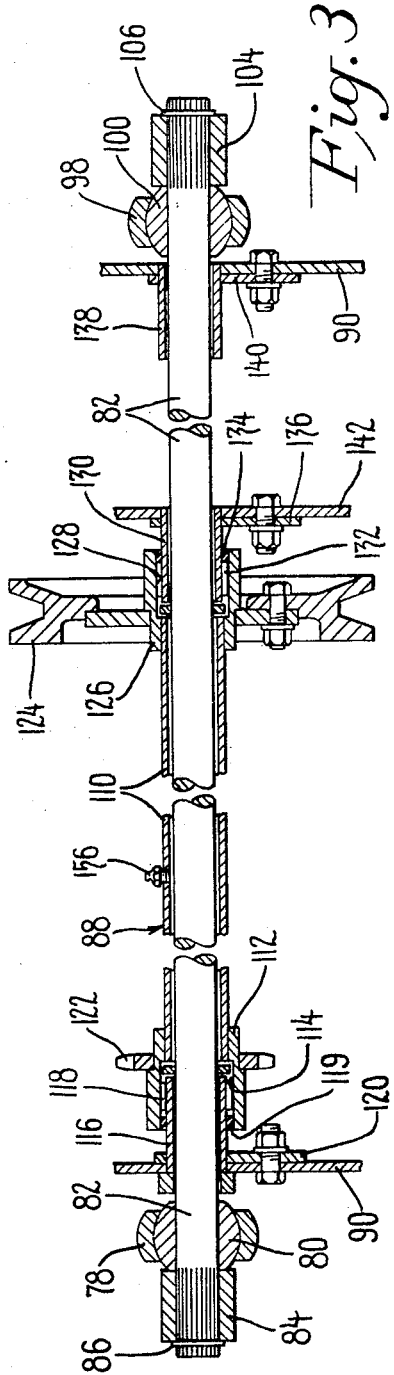

INVENTORS.
WILLIAM H. TWIDALE
BY MARK K. BYRNES

ATTORNEYS.

3,727,385

AGRICULTURAL VEHICLE

BACKGROUND AND SUMMARY OF THE INVENTION

The present invention relates in general to agricultural machines and more in particular to a harvesting machine of the swather type which is equipped with a pivotally movable platform or table assembly and to an improved flotation and leveling system for the table assembly.

As is known, conventional harvesting machines of the swather type have a platform or table assembly in fore or aft position of the machine which is equipped with the usual crop handling mechanisms to cut standing crop for deposit in windrows behind the machine.

Typically, the platform or table assembly of the harvester supports a variety of driven devices, such as crop cutting mechanisms, pick-up reels, bat reels, crop conveyors, and the like, all of which are mechanically driven from a power source on the harvester vehicle. The table or platform is conventionally mounted on the vehicle such that the platform can be raised and lowered selectively for transport of the machine and for selective cutting heights of the crop to be harvested. Generally, the platform is pivotable in its operating position to freely follow the contour of the ground over which the harvester travels and to permit passage over obstacles on the ground to enable the harvesting mechanism to be operated in close proximity to the ground without damage to any vital components of the mechanism.

Conventionally, it is known to provide counterbalancing means, such as springs, to aid in the irregular raising or lowering movements of the table assembly during movement of the harvester over the ground, and providing a table suspension system with flotation characteristic. In the past, however, the counterbalancing means have been provided between the frame of the vehicle and the platform, independently of the platform lowering or raising mechanism, including power lift cylinders. Thus, the deflection and consequently the effectiveness of the counterbalancing means considerably varied in accordance with the selected height of the table from the ground. The counterbalancing springs are generally designed and positioned such between the frame and the platform that optimum spring force is exerted when the platform is close to the ground. The counterbalancing force of the springs, however, rapidly decreases when the platform is raised from the ground, thus partially defeating the counterbalancing purpose.

As is known, the table assemblies are of substantial size and, as mentioned before, carry many structural components and drive mechanisms for the components. Thus, obviously, a strong framework is required to carry such heavy structure while the table must be pivotally supported on the vehicle for movement towards or away from the ground. Hitherto, this required a plurality of lift and support arm and linkage systems, such as parallelograms, to maintain the pivotal movement of the table within predetermined limits and to permit table movement in fore and aft direction relative to the vehicle as well as in a vertical direction.

Furthermore, it is necessary, in many instances, to mount the drive components of the table assembly towards one side of the platform. That side of the platform, therefore, will be heavier than the opposite side, resulting in an unbalanced weight distribution. This has to be accommodated for by the table lift and linkage arrangement, which cannot always be effectively accomplished. Due to structural limitations, the table lift and linkage arrangement cannot always accommodate the unbalanced weight distribution. Thus, in an elevated position, the table assembly tends to tilt towards the heavier side.

In other instances, as is known, the table assemblies are equipped with transversely shiftable crop conveyor means adapted to move the cut crop towards either end of the table for side delivery of windrows. The resulting weight transfer from one end of the table to the other by shifting of the conveyor means previously had likewise to be accommodated for by proper adjustment of the lift arms or supporting linkage which, similarly, cannot always be effectively accomplished, or at best, is time consuming and requires special attention by the operator of the machine.

The present invention provides an improved lift arm and linkage system for a table or platform of a harvesting machine adapted to effectively overcome the above problems and, particularly, the problem concerned with unbalanced weight distribution along the table or platform.

Accordingly, it is the primary object of the present invention to provide improved lift arm and supporting means for mounting a table platform on an agricultural machine, including improved table platform counterbalancing means and self-acting platform leveling means in case of unbalanced weight distribution.

It is another object of the present invention to provide a counterbalancing system for a table platform of such construction that the counterbalancing force remains completely unaffected by the relative operating position of the platform and which permits independent lifting movement of either end of the table in response to irregularities in the ground contour.

Another object of the invention resides in the provision of a lift system for a table platform, including counterbalancing means in which the platform is supported only by the counterbalancing means when the platform is in lowered operating position independently of any mechanical lifting means whereby the platform is able to freely float to follow the contours of the ground.

Still another object of the present invention is to provide a suspension system for the table platform of an agricultural machine, including means to automatically maintain the table platform in a level and stable operating position in response to unbalanced weight distribution along the table platform.

The above and other objects and novel features of the present invention will become more fully apparent by reference to the following detailed description in connection with the appended drawings.

The accompanying drawings illustrate a preferred embodiment of the invention in which:

FIG. 2 is a transverse cross-section through the front end of the agricultural vehicle facing in the direction of forward travel of the vehicle and in which portions at the right hand side have been omitted for clarity;

FIG. 3 is an enlarged longitudinal cross-section along the center line of the torsion bar arrangement shown in FIG. 2 and as seen in the direction of the arrows 3—3 thereof;

DETAILED DESCRIPTION OF THE INVENTION

Figure 1:
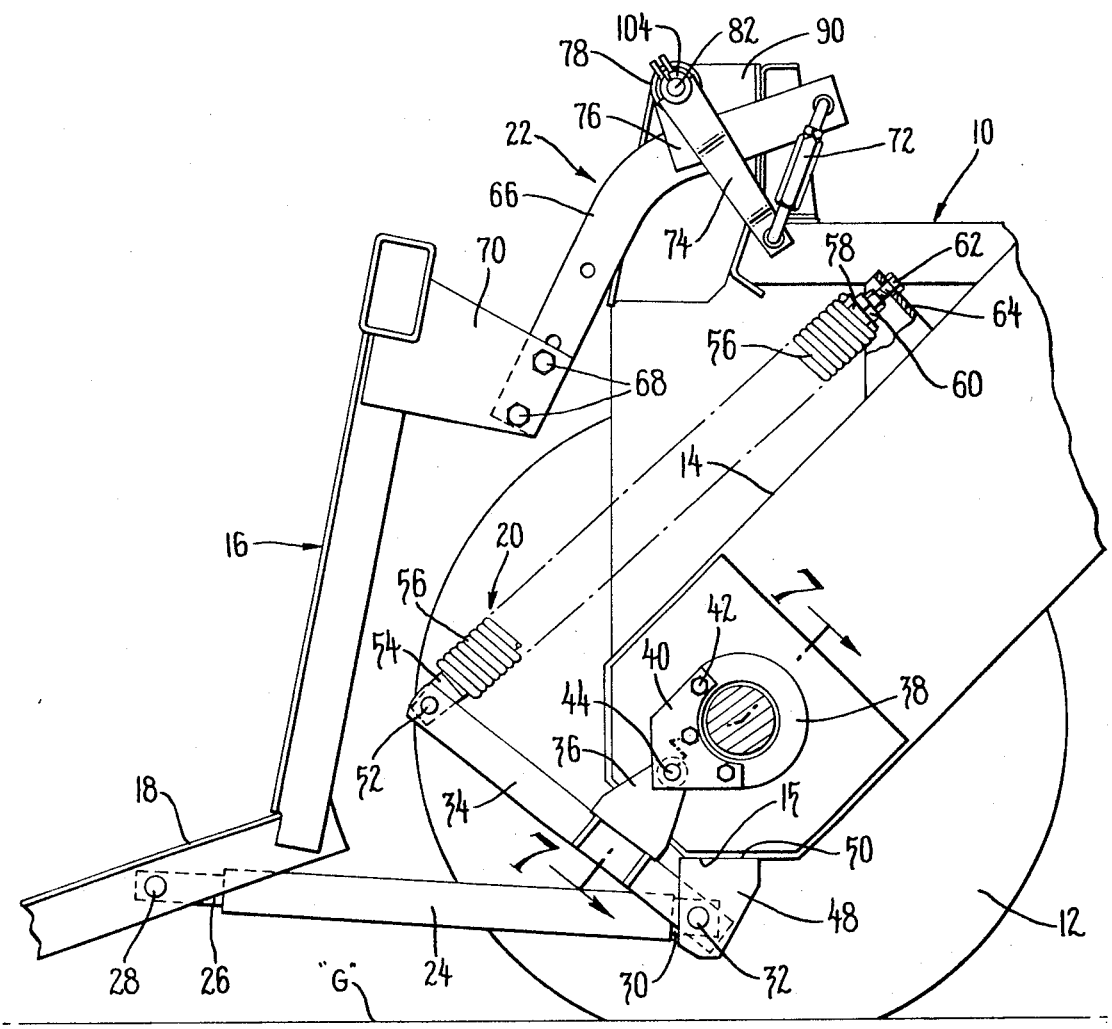
FIG. 1 is a fragmentary side elevation of the front portion of an agricultural machine having a table platform connected thereto by means of a lift and suspension system constructed in accordance with the present invention, the table platform being schematically shown in lowered operating position.

With continuous reference to the drawings, FIGS. 1 and 2 schematically indicate a front end frame structure 10 of an agricultural harvesting machine such as a windrower and which may be of any known construction. The harvesting machine is forwardly supported on traction wheels 12. The traction wheels 12 are supported at the lower end of a drive mechanism housing 14, which is part of the frame 10. The drive mechanism in the housing 14 is adapted to rotate traction wheels 12 to propel the machine over the ground "G."

Located in front of frame 10 and traction wheels 12 is a conventional header or table assembly, only schematically indicated at 16, and in which the platform 18 is adapted to be equipped with power driven crop gathering and working means (not shown), as is common practice. The platform 18 in FIG. 1 is shown lower-most operating position relative to the ground "G."

For selective lowering and raising of the platform 18 relative to ground "G," the table assembly 16 is pivotally suspended from frame 10 by means of oppositely disposed lower and upper suspension assemblies 20 and 22 respectively. The pair of lower suspension assemblies 20 are substantially identical and one such assembly is provided at both sides of the centerline of table assembly 16 as will be understood. Since both lower suspension assemblies 20 are identical, it will suffice to describe only one of the assemblies.

The lower suspension assemblies 20 are composed of a lower extendable lift arm 24 which may be a fluid cylinder having a reciprocating piston rod 26 which is pivotally attached at 28 to platform 18. The rear end 30 of lift arm cylinder 24 is pivotally attached by means of pivot pin 32 to the lower end of a rocker arm 34 which extends angularly upwardly from the lift cylinder 24. Rocker arm 34 extends below the lower forward end of the drive housing 14 and is provided intermediate its end with a bifurcated bracket member 36 which extends in a direction normal to the longitudinal axis of rocker arm 34 and upwardly therefrom.

Figure 7:
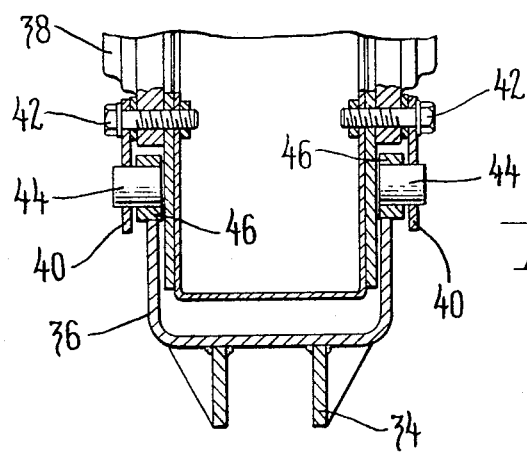
FIG. 7 is a fragmentary cross section through the rocker arm pivot arrangement interconnected between the counterbalancing means and the lift arm cylinder in the lower portion of the system shown in FIG. 1 and as seen along line 7—7 thereof.

As more clearly shown in the cross section in FIG. 7, attached to the central hub portion 38 of drive housing 14 are a pair of opposite identical flanges 40 secured to hub portions 38 of drive housing 14 by means of bolts 42. The protruding portions of opposite flanges 40 each retain a trunnion pin 44 in axial alignment with each other. The opposite arms of bifurcated bracket 36 extend along the outside of drive housing 14 and are each provided at their ends with a bushing 46 in which the inner ends of the trunnion pins 44 are journaled. Thus, bifurcated bracket portion 36 of rocker arm 34 is pivotally retained on drive housing 14 by means of support flanges 40 and trunnion pins 44 for rocking movement around pins 44 as will be explained.

The lower end of rocker arm 34 is secured to a stop bracket 48 which has an upper flat surface 50 for abutment against surface 15 of drive housing 14 to thereby limit rotation of rocker arm 34 in counterclockwise direction around pivot pin 32, as viewed in FIG. 1, for a purpose to appear.

The opposite end of rocker arm 34 is pivotally connected at 52 to the outer end of a spring retainer 54 adapted to retain the lower end of a tension spring 56.

Tension spring 56 is a longitudinally coiled spring having a predesigned spring characteristic adapted to exert maximum spring force in the lower-most position of the table assembly 16, which is illustrated in FIG. 1. The upper end of spring 56, which extends alongside drive housing 14, is secured to an adjustable retainer 58 having a threaded shank and nut assembly 60 by which the tension of the spring may be adjusted as required. The upper end of threaded shank 60 is secured by means of a head 62 to a support bracket 64 attached to drive housing 14.

As mentioned previously, the two lower suspension assemblies 20 on each side of the table assembly 16 adjacent the traction wheels 12 each include a lift cylinder 24, a rocker arm 34 and a tension spring 56. The tension spring 56 exerts a constant force on the rocker arm 34 to rotate rocker arm 34 around pivot 44 in a clockwise direction. The mass of the platform 18 exerts a force to rotate rocker arm 34 around pivot 44 in a counterclockwise direction which is slightly greater than the force of the spring 56 until the stop member 48 abuts against surface 15 of drive housing 14 as shown in FIG. 1. In the lowered position of table assembly 16, the inactive lift cylinder 24 acts as a solid link between the table 18 and the other end of rocker arm 34 to which the lift cylinder is pivotally attached by pivot pin 32. In the lowered position of table assembly 16, close to the ground, springs 56 are at their maximum spring force capacity to provide opposite counterbalancing means for effective flotation of table assembly 16 in correspondence with the ground contour over which the machine travels. Thus, if the left side of table assembly 16, which is illustrated in FIG. 1, should encounter an obstruction on the ground such as debris, stones or the like, that end of the table will be lifted from the ground a distance corresponding to the height of the obstruction and cause rotation of rocker arm 34 around pivot 44 by means of lift cylinder 24 which acts as a solid link. Rotation of rocker arm 34 causes compression of spring 56 to thereby provide a floating movement of the table over the obstruction. After the obstruction is passed, the weight of the table itself causes the raised end of the table to move back towards the ground whereby rocker arm 34 is again rotated against the tension of the spring until stop bracket 48 again abuts against drive housing 14, thereby providing a fixed stop against further downward movement of table assembly 16.

As a matter of common practice, one of the pair of lift cylinders 24 may be of larger diameter than the other to compensate for unequal weight distribution and permit raising and lowering of the table assembly in stable condition.

Figure 4:
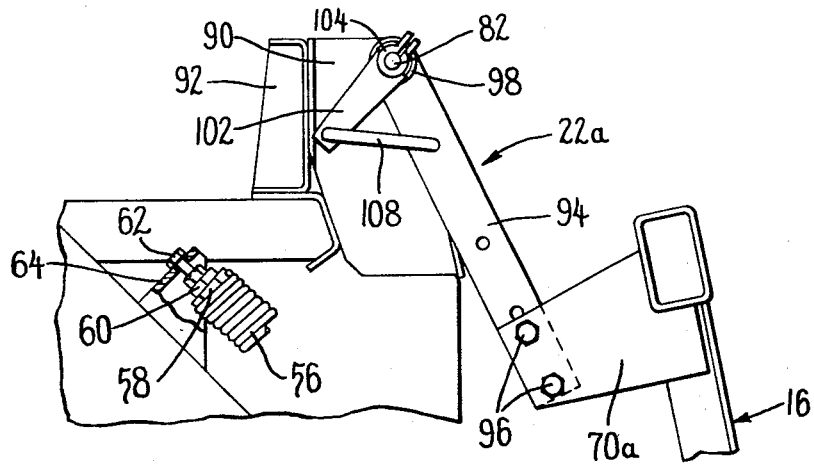
FIG. 4 is a fragmentary right hand side view of the stabilizer system of the present invention illustrating the opposite side of the torsion bar linkage.

An upper suspension assembly 22 is provided at the left side of table assembly 16 as shown in FIG. 1, and a similar upper suspension assembly 22a is provided at the right side as shown in FIG. 4. The left side upper suspension assembly 22 will now first be described in detail with reference to FIGS. 1 and 2.

The left upper suspension assembly 22 is comprised of a lift arm member 66 which is "boomerang" shaped in plan view as shown, having one end rigidly secured by means of bolts 68 to the end of a bracket 70 extending rearwardly from the upper end of table assembly 16. The other end of lift arm 66, which extends rearwardly away from table assembly 16, is attached to an adjustable link member 72. The other end of adjustable link member 72 is pivotally connected to the free end of a lever 74 which is positioned adjacent lift arm 66 in overlying angularly disposed position thereto. It will be noted that lever 74 extends angularly downwardly in relation to the upper end of lift arm 66 whereby adjustable link member 72, which is normally rigid, provides a force-transmitting connection between the upper end of lift arm 66 and the free end of lever 74.

Lift arm 66 intermediate its ends but closer to its upper end is provided with a welded-on bracket member 76 which extends upwardly therefrom for pivotal securement of lift arm 66 intermediate its ends to the outer member 78 of a spherical bearing 80 for rotation therearound. The spherical bearing 80 is supported on the outer end of a transverse rod member 82 which extends between opposite upper suspension assemblies 22 and 22a respectively, in transverse direction to the line of travel of the machine.

The other end of lever 74 is secured to the outer end of longitudinal transverse rod member 82 adjacent of and outwardly of spherical bearing 80 by means of a clamping sleeve 84 which is splined to the outer end of transverse rod member 82 and is held in retainment against spherical bearing 80 by means of a lock ring 86.

Transverse rod member 82 comprises part of a stabilizer and drive shaft assembly 88 which is supported at opposite ends within side brackets 90 secured to a cross beam member 92 which extends transversely between opposite drive housing 14 and forming a part of the frame assembly 10. The cross beam frame member 92, as seen in FIG. 2, extends in adjacent parallel position relative to stabilizer and drive shaft assembly 88.

With additional reference to FIG. 4 which illustrates the right hand upper suspension assembly 22a (as seen in the direction of travel of the machine), it will be seen that the opposite outer end of transverse rod member 82 is similarly supported for rotation within a similar bracket 90 of the frame structure 10 and extends a distance outwardly therefrom.

The right hand upper suspension assembly 22a is similarly comprised of a lift arm 94 which is also rigidly attached by means of bolts 96 to a similar opposite bracket 70a extending from the opposite upper end of table assembly 16 in the manner as shown in FIG. 1.

Right hand upper lift arm 94 is of straight longitudinal configuration in contrast to the "boomerang" shape of left hand lift arm 66. The other end of right hand upper lift arm 94 is similarly secured to the outer member 98 of a spherical bearing 100 for rotation. Bearing 100 is supported on the opposite outer end of transverse rod member 82 adjacent the outside of supporting bracket 90.

Similarly, a lever 102 is provided having one end attached by means of clamping sleeve 104 to the outer end of transverse rod member 82. The clamping sleeve 104 is similarly splined to the outer end of rod member 82 and is retained in longitudinal direction against spherical bearing 100 by means of retaining ring 106.

As seen in FIG. 4, lever 102 extends in angularly offset position relative to lift arm 94 and the free end of lever 102 is connected to a rigid link member 108. The other end of rigid link member 108 is connected to the right hand upper lift arm 94 at a selected point intermediate the ends of the lift arm. Thus, the right hand upper lift arm 94 and right hand lever 102 are similarly interconnected by a rigid link member in force-transmitting relationship.

As described, the opposite upper suspension assemblies 22 and 22a at opposite sides of the table assembly 16, are interconnected by transverse rod member 82. Thus, upon relative raising or lowering movement of table assembly 16 at either end or at both ends simultaneously the upper suspension assemblies 22 and 22a will be caused to rotate due to the rigid connection of the upper lift arms 66 and 94 to the upper end of the table assembly. The pivotal movement of table assembly 16 is translated by the respective upper lift arms 66 and 94 into a rocking movement having the axis of transverse rod member 82 as its pivot. Movement of either left or right hand upper lift arms 66 and 94 is transferred to their associated lever 74 or 102 respectively, by the interconnecting link members 72 or 108. It will be noted that left and right upper lift arms 66 and 94 are freely rotatable around transverse rod member 82 by means of spherical bearings 80 and 100 whereas the associated levers 74 and 102 are non-rotatably secured to the respective outer ends of transverse rod member 82 so that, upon rocking movement of the levers in either direction, a rotational force will be exerted on transverse rod member 82.

Transverse rod member 82 in the present arrangement defines a torsion bar adapted to maintain the platform 18 of table assembly 16 in a level horizontal position. As mentioned previously, the arrangement of the various components along the table platform 18 may be such that one side of platform 18 is heavier than the other side of the platform. Although this is normally compensated for by variation in size of the pair of lift cylinders 24, as previously mentioned, there is, in a suspended or elevated position of the platform 18, a tendency for the heavier side of the platform to drop relative to the other side. However, because of the torsional linkage arrangement at both sides of table assembly 16 (defined by the upper suspension assemblies 22 and 22a and interconnecting torsion bar 82), the platform 18 of table assembly 16, at all times, will be maintained in horizontal level position regardless of the weight unbalance along the platform 18, as will be more fully explained in the description of the operation of the device.

With more particular reference to FIGS. 2, 3, 5 and 6, the stabilizer and drive shaft assembly 88 further comprises a longitudinal tubular member 110 disposed around a substantial portion of torsion bar 82. The tubular member 110 is rotatable around torsion bar 82 and at one end is supported within a cylindrical adapter 112 which may be welded or otherwise secured to tubular member 110. Adapter 112 has a counterbore 114 of larger diameter than tube 110 for axial extension over a sleeve member 116 through which the torsion bar 82 extends in freely rotatable relationship. Adapter 112 is rotatable around sleeve member 116 by means of a bearing assembly 118 and the outer end of adapter 112 is sealed against the sleeve support member 116 by means of a sealing assembly 119. The sleeve support member 116 is non-rotatably supported within a flange 120 which is stationarily secured to frame bracket 90. The adapter 112 at one end of tube 110 is provided to support a sheave, pulley or the like 122 for rotation therewith.

Tubular member 110 defines a drive shaft rotatable around torsion bar 82 by means of a driven wheel such as a pulley or the like 124 disposed at the inner end of tubular drive shaft 110. Pulley 124 is similarly supported on a cylindrical adapter 126 which is attached, as by welding or the like, to the other end of tubular drive shaft 110. Similarly, adapter 126 has a counterbore 128 of larger diameter than the outer diameter of tubular drive shaft 110 for axial extension over a sleeve support member 130. Adapter 126 is rotatable around sleeve support member 130 by means of a bearing assembly 132 and the outer end of adapter 126 is sealed by means of sealing assembly 134. Similarly, sleeve support member 130 is non-rotatably secured within a flange member 136 and torsion bar 82 freely rotatably extends through sleeve support member 130.

In order to maintain the exposed portion of the torsion bar 82, at the right side of the assembly in FIG. 2 and 3, in axial alignment, the end of torsion bar 82 inwardly of bracket member 90 is rotatably supported within another sleeve support member 138 which is non-rotatably secured within a flange 140 attached to the frame bracket 90.

Figure 5:
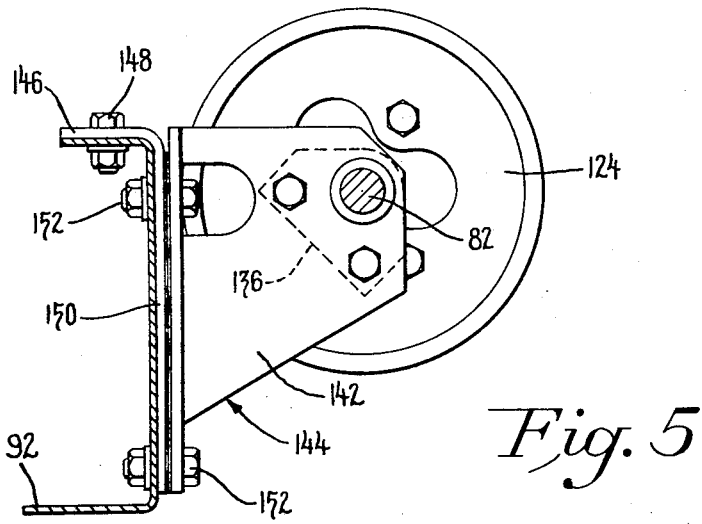
FIG. 5 is a transverse cross-section of the torsion bar arrangement shown in FIG. 2 and as seen in the direction of arrows 5—5.
Figure 6:
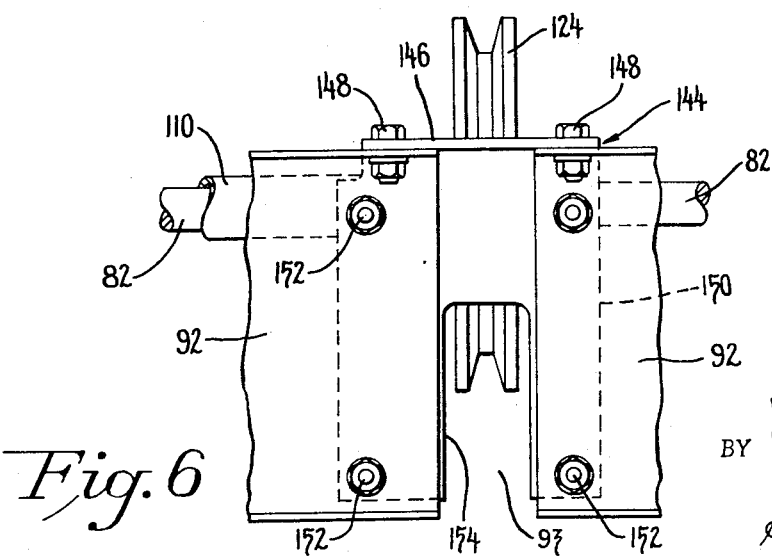
FIG. 6 is a fragmentary rear view of a portion of the stabilizer system shown in FIG. 2 and as seen in the direction of arrows 6—6.

With particular reference to FIGS. 5 and 6, the outer end of tubular drive shaft 110, as described above, is supported on sleeve support member 130 which is non-rotatably secured within the flange member 136. Flange member 136 is rigidly attached to a flange portion 142 of a bracket support assembly 144 through which torsion bar 82 extends. Bracket support assembly 144 extends rearwardly adjacent pulley 124 for attachment to the frame crossbeam member 92 of the vehicle. As seen in FIG. 2, the crossbeam member 92 of the frame of the vehicle is divided in the vicinity of the drive pulley 124 to provide a space 93 to permit rearward extension of a drive belt (not shown) from the pulley 124. The top portion 146 of bracket support assembly 144 is attached by means of bolts 148 to both sections of crossbeam member 92 across the space 93.

As more particularly seen in FIG. 6, bracket portion 146 is integral with a right angularly disposed plate member 150 which extends across the open space 93 and in lateral abutment with the side of crossbeam member 92 facing the drive shaft and torsion bar assembly 88. Plate member 150 of bracket assembly 144 is secured to both portions of crossbeam member 92 adjacent the space 93 by means of screws 152. The plate member 150 is provided with a cut out or recess 154 disposed in planar alignment with the pulley 124 to permit extension of the drive belt from pulley 124 conjointly with the space 93 provided in crossbeam member 92.

To provide for lubrication of drive shaft bearings 118 and 132, a grease fitting 156 is provided in tubular drive shaft 110 intermediate its ends whereby lubricant is permitted to be introduced into the radial space between the torsion bar 82 and the interior of tubular drive shaft 110 for outward flow towards drive shaft bearings 118 and 132.

It will be understood that pulley 124 is drivingly connected by means of a drive belt (not shown) to a power transmission associated with the vehicle indicated by the frame structure 10. Similarly, pulley 122, at the other end of tubular drive shaft 110, is drivingly connected by any conventional means to the driven components (not shown) carried by the table assembly 16. Thus, by application of driving power, tubular drive shaft 110 is rotated for transfer of driving force from pulley 124 to pulley 122 and subsequently to the driven components on table assembly 16, as is known. The opposite coaxial bearing and support assemblies 112, 116, 126 and 130 assure axial alignment of drive shaft 110 in concentric relationship around torsion bar 82. Tubular drive shaft 110, and its associated supports, at the same time, provide axial alignment for torsion bar 82 along a substantial portion of its length to counteract any bending forces which may occur.

In operation, when the table assembly 16 is to be elevated, the opposite lift cylinders 24 are actuated for extension of their piston rod 26 to thereby swing table assembly 16 upwardly around the axis of torsion bar 82 by means of the connecting upper lift arms 66 and 94. Conjoined rocking movement of upper lift arms 66 and 94 at opposite ends of torsion bar 82, by elevation of table assembly 16, causes rotation of torsion bar 82 within tubular drive shaft 110 and associated support sleeves 116, 130, and 138. Since both upper lift arms 66 and 94 are caused to pivot at the same rate of rotational movement because of exertion of the same lifting force at both ends of table assembly 16 by means of opposite lift cylinders 24 (and when the table is in balanced weight condition), torsion bar 82 will normally just be rotated without any twisting effect. However, if one side of the table assembly 16 is heavier than the other side, the heavier side will tend to drop relative to the other side of the table assembly. This causes a relative difference in rotation between upper lift arm 66 and 94 with the effect that a longitudinal twisting force is applied to torsion bar 82. According to the predetermined torsional characteristic of torsion bar 82, a force in opposite direction and in direct proportion to the heavier weight at the one side of the table assembly will be exerted, sufficient to maintain table assembly 16 in a level horizontal position.

Torsion bar 82 can be pre-loaded in accordance with the weight distribution of table assembly 16 by means of longitudinal adjustment of the adjustable link member 72 between upper lift arm 66 and lever 74 of the left hand upper suspension assembly 22, as previously mentioned.

When the table assembly 16 is in lowered operating position, as illustrated in FIG. 1, the weight of the table assembly is resiliently supported by the pair of counterbalancing spring assemblies 56 of the opposite lower suspension assemblies 20. Thus, when a depression or elevation on the ground is encountered, the table assembly 16 is enabled to float to permit close following of the contours of the ground, whereby the stabilizer means, (comprising torsion bar 82 and upper lift arm assemblies 22 and 22a), compensate for uneven weight distribution along table assembly 16 to maintain table assembly 16 in equilibrium regardless of the weight distribution.

Thus, it will be seen from the foregoing description and with reference to the attached drawings that the present invention provides improved stabilizing means for the table assembly of an agricultural machine to accommodate uneven weight distribution on the table assembly which is effective to provide a counterbalancing force in direct proportion to the heavier load at one side of the table assembly relative to the other side to thereby tend to maintain the table assembly at all times in a level horizontal position.

The present stabilizer means includes a torsion bar and a pair of upper lift arm assemblies interconnected by lever means to the opposite ends of the torsion bar so that any relative difference in pivotal movement of the upper lift arm assemblies in response to a transverse tilting movement of the table assembly towards one or the other side creates a counterbalancing force in opposite direction to maintain the table assembly in a level horizontal position.

The present improved stabilizer system in conjunction with the lower suspension assemblies, as herein described, provides improved stability for the table assembly in either elevated or lowered position without affecting in any way the desired floatability of the table assembly to permit close ground contour following when the table assembly is in operating position.

Although the present invention has been described by way of a preferred embodiment, it will be understood that the particular embodiment herein described is subject to various modifications in arrangement and detail such as come within known or customary practice known in the art to which the invention pertains without departing from the essential characteristic and spirit of the invention as defined by the appended claims.

What we claim is:

1. In an agricultural vehicle having a frame, at least one pair of ground engaging wheels supported on said frame, a platform pivotally mounted on said frame forwardly of said pair of wheels; said frame having a supporting member extending transversely between said wheels for pivotal attachment of said platform thereto; a pair of extendable members for adjustable support of said platform to raise or lower said platform relative to the ground; a pair of counterbalancing means, each counterbalancing means being connected between said frame and one end of a respective one of said extendable members; the improvement comprising a pair of lift arms each having one end connected to said platform; torsional force-transmitting means operatively interconnecting the other ends of said pair of arms along an axis transverse to the longitudinal axis of said vehicle; lever means secured to each end of said torsional force-transmitting means and a pair of link means interconnecting each of said lever means with one of said lift arms such that when one outer end of said platform is lowered relative to the other outer end, the arm at said one outer end causes rotation of said lever means associated with said one arm through connection of said link means to activate said torsional force-transmitting means so as to apply a rotating force in opposite direction in order to level said platform.

2. In an agricultural vehicle having a longitudinal axis comprising a frame structure having axially spaced ground supporting wheels journalled on a common transverse axis; an implement including a normally horizontally disposed platform elongated in a direction transverse to the longitudinal axis of said vehicle; the improvement comprising a pair of mounting elements connected to said platform at longitudinally transversely spaced points to pivotally mount said platform to said frame structure for tilting movement of each outer end of said platform independently of the other end thereof about the longitudinal axis of said vehicle; a pair of counterbalancing elements carried by said frame structure and operatively connected at longitudinally transversely spaced points to said platform for floatingly supporting said platform; link and force-transmitting means operatively connected between said platform and said frame structure for bodily raising and lowering said platform relative to said wheels; said means including an extendable link member spaced towards each side of said longitudinal axis pivotally secured at one end of said platform; a pivotal rocker arm spaced towards each side of said longitudinal axis secured to said frame for pivotal movement thereon; said pivotal rocker arms each interconnecting the other end of one of said extendable link members with one of said counterbalancing elements; a pair of arms at opposite sides of said longitudinal axis having one end rigidly connected to said platform; a transverse rod member disposed rearwardly of said platform in parallel position to the axis of said wheels; the opposite outer ends of said transverse rod member being disposed within said frame structure for relative rotation therein; a lever having one end thereof mounted at each end of said transverse rod member, the other end of each of said levers connected to a respective link member, the other end of each of said link members being connected to the other end of a respective one of said arms; said transverse rod member comprising a torsion bar and permitting said torsion bar upon relative raising or lower movement of either one outer end of said platform to exert a force in opposite directions by means of said rotation of the respective one of arm, lever and link member to level said one outer end relative to the other outer end of said platform.

3. In an agricultural vehicle having a frame, at least one pair of ground engaging wheels supported on said frame and a platform pivotally mounted on said frame forwardly of said pair of wheels; a floatation and lift suspension system connecting said platform with said frame, the improvement comprising: a pair of link and interconnecting lever assemblies connected between said frame and said platform; each of said assemblies including a first element fixed to said platform, a second element pivotally secured to said first element, and a link member pivotally connected between said first and second element; each of said second elements being further interconnected one to each other at opposite ends of a stabilizer assembly supported within said frame along a direction transverse to the direction of travel of said vehicle; counterbalancing means operatively connected between said frame and said platform; extendable lifting means having one end connected to said platform, and rocking lever means having opposite ends pivotally connected to the free end of said counterbalancing means and to the other end of said lifting means respectively and being pivotally supported for rocking movement on said frame; said stabilizer assembly comprising a torsion bar maintaining said platform in a level position upon raising or lower movement of either outer end of said platform relative to the ground.

4. In an agricultural vehicle comprising a wheeled frame adapted for ground travel; a platform positioned forwardly of said frame and extending in a transverse direction thereto; a support structure for raising and lowering said platform relative to said frame and said ground, said support structure comprising an extendable lift member having one end pivotally connected to said frame and an opposite end pivotally connected to said platform; resilient counterbalancing means connected to said frame for extension between said frame and said extendable lift member; said resilient counterbalancing means maintaining opposite ends of said platform in adjustably lowered position on said ground; a pair of upper lift arm and lever assemblies connected to said platform; each of said lift arms being rigidly connected to said platform; means connecting each of the other ends of said lift arms to one end of a lever associated therewith; a longitudinal stabilizer assembly supported by said frame in transverse direction of travel of said vehicle; each of said lift arm and lever assemblies being connected to a respective outer end of said stabilizer assembly so that, when one of said lift arm and lever assemblies is actuated for rocking movement due to unilateral movement of said platform, said stabilizer assembly will be effective to exert a force in opposite direction to the unilateral movement of said platform.

5. The support structure, as defined in claim 4, further characterized by the provision of rocking means pivotally supported on said frame; said rocking means comprising a longitudinal member having one end pivotally connected to the free end of the resilient counterbalancing means and the other end to one end of said extendable lift member; said pivotal connection of said rocking means to said frame being located intermediate the ends of said longitudinal member to cause rocking movement of said longitudinal member upon exertion of a force at either end of said member.

6. The support structure, as defined in claim 5, characterized by the provision of stop means at one end of said longitudinal member of said rocking means for cooperating with abutment means on said frame to limit rocking movement of said rocking means in one direction.

7. In an agricultural vehicle comprising a wheeled frame adapted for ground travel; a platform disposed forwardly of said frame and extending transverse to the direction of travel of said vehicle; a pair of laterally spaced suspension assemblies carried by said frame at opposite sides of said platform, each suspension assembly comprising a lower lift member having a rearward end pivotally connected to said frame and a forward end pivotally connected to said platform; a resilient counterbalancing means having one end connected to said frame, and a rocker arm pivotally connected intermediate its ends to said frame; one end of said rocker arm being pivotally connected to the rear end of said lift member and the opposite end of said rocker arm being pivotally connected to the other end of said resilient counterbalancing means; a pair of upper lift arm and lever assemblies disposed between said platform and said frame, said lift arms being rigidly connected to said platform, each of said lift arm and lever assemblies including an intermediate link member for force transmitting connection of adjacent ends of one lift arm and one lever of each of said lift arm and lever assemblies; and a longitudinal rod member rotatably supported within said frame in transverse direction of travel of said vehicle; each of said levers of said lift arm and lever assemblies being secured to one end of said longitudinal rod member so that, upon pivotal movement of said platform relative to said frame, said lift arm and lever assemblies will be caused to rock around the axis of said longitudinal rod member in either clockwise or counterclockwise direction, conjointly or separately, said longitudinal rod member providing a rotational energy-storing capacity effective to counteract individual rotational rocking movement of either lift arm and lever assembly in either direction of rotation.

8. The suspension assembly, as defined in claim 7, characterized in that one end of said rocker arm at the rear end of said lower lift member is provided with stop means for co-acting engagement against said frame in the lowered position of said platform to thereby limit further rotational movement of said rocker arm in one direction.

9. The suspension assembly as defined in claim 7, characterized in that said longitudinal rod member comprises a torsion bar; said lever of each of said pair of upper lift arm and lever assemblies being rigidly connected to a respective end of said torsion bar so that, upon rocking movement of said lift arm and lever assemblies in either direction, said torsion bar will be loaded to exert a force in the corresponding opposite direction to thereby maintain said platform in a level position relative to said frame.

10. The suspension assembly, as defined in claim 9, further characterized in that one of said intermediate link members interconnecting one of said lift arms with one of said levers is provided with means for longitudinal length adjustment whereby said one lever can be rotated relative to said one lift arm and independently of the other lever and lift arm assembly to preload said torsion bar.

11. In an agricultural vehicle comprising a wheeled frame adapted for ground travel along a longitudinal axis; a platform positioned forwardly of said frame and extending transversely to said longitudinal axis, said platform having crop gathering means supported thereon; a pair of laterally spaced support structures on opposite sides of said longitudinal axis, each of said support structures comprising a lower extendable lift member having a forward end pivotally connected to said platform; a longitudinal resilient member having one end connected to said frame; a rocker arm pivotally interconnecting the other end of said longitudinal resilient member with the other end of said lower lift member; said rocker arm being pivotally supported on said frame intermediate its ends; a pair of upper lift assemblies, one at each side of said frame; a transverse torsion bar rotatively carried by said frame for extension between said upper lift assemblies; said upper lift assemblies comprising a pair of levers, one of said levers non-rotatably connected to one end of said torsion bar and the other of said levers non-rotatably connected to the opposite end of said torsion bar; a pair of lift arms each having one end rigidly connected to said platform, the other end of each of said lift arms being rotatably connected to opposite ends of said torsion bar conjointly with said pair of levers; a pair of rigid link members; one link member pivotally connecting one of said levers to one of said lift arms and the other of said link members pivotally connecting the other of said levers to the other of said lift arms; said pair of link members maintaining a predetermined force-transmitting relationship of said pair of levers relative to said pair of lift arms and causing rocking of said levers upon respective pivotal movement of said lift arms.

12. The support structure as defined in claim 11, characterized by one of said link members being adjustable in length to selectively vary the torque characteristic of said torsion bar.

* * * * *